(No Model.)

T. S. FERGUSON.
EGG CARRIER.

No. 550,494.                    Patented Nov. 26, 1895.

WITNESSES:
Eli Hodgins
G. P. Bolser.

INVENTOR
Thomas Schoales Ferguson
BY ⎯⎯⎯⎯⎯
ATTORNEY.

ANDREW B. GRAHAM. PHOTO-LITHO. WASHINGTON. D.C.

UNITED STATES PATENT OFFICE.

THOMAS SCHOALES FERGUSON, OF OMAHA, NEBRASKA.

EGG-CARRIER.

SPECIFICATION forming part of Letters Patent No. 550,494, dated November 26, 1895.

Application filed July 12, 1895. Serial No. 555,809. (No model.)

*To all whom it may concern:*

Be it known that I, THOMAS SCHOALES FERGUSON, residing at Omaha, in the county of Douglas and State of Nebraska, have invented certain useful Improvements in Egg-Carriers; and I do hereby declare that the following is a full, clear, and exact description of the invention, such as will enable others skilled in the art to which it appertains to make and use the same, reference being had to the accompanying drawings, which form a part of this specification.

This invention has relation to a new and novel egg-carrier, comprising a suitable case having removable egg-trays, as will be described more fully hereinafter.

Figure 1:
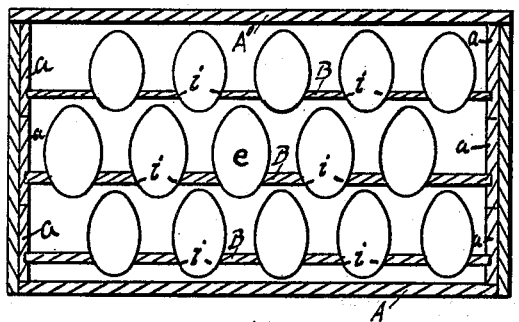

In the accompanying drawings, Figure 1 shows a sectional view of an egg-case embodying my invention. Fig. 3 shows a top view disclosing the position of the various trays, while Fig. 2 shows an end view with portions removed.

In the drawings I have shown but three trays. It will be understood, however, that any number of trays can be used and the trays provided with a suitable number of openings adapted to receive the eggs.

A represents a suitable casing adapted to hold a desirable number of egg-trays B, all of which trays are alike in construction. In practice I prefer making each tray of a thickness so as to nicely accommodate seventy-two eggs. The trays are made of wood, and so are slightly springy. They are further provided with openings $i$, in shape nicely adapted to receive the egg, as is shown in the drawings. The eggs, further, are placed in an upright position, the larger end upward, which position is best for the preservation of the eggs, and, further, the egg being held in an upright position is less liable to breakage. The trays are so arranged that they are dovetailed in two end pieces, (marked $a\ a$,) which project above and below the trays, as is shown in Fig. 1. In arranging these trays in the case the trays are reversed, so that the eggs of one tray come between the eggs of the tray below, as will be noticed in referring to Figs. 1 and 2.

Figure 2:
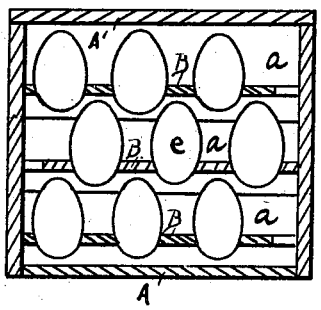
Figure 3:
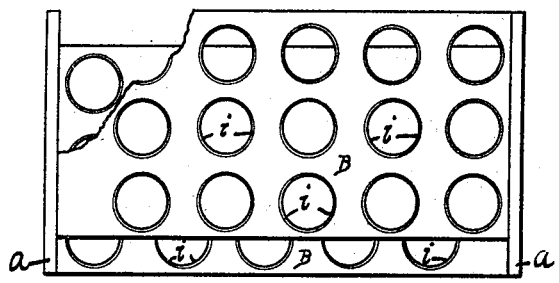

In referring to Figs. 2 and 3 it will be noticed that the trays B are not as wide as the width of the box. This forms an economic feature in the construction of my egg-carrier. The end strips $a$, however, which are used in pairs, are made of a width corresponding to the width of the egg-crate proper, so that when the different trays are placed in position they are permitted no lateral movement by virtue of the snugness with which these end strips work into the box. The trays, however, are all duplicate or made alike and are bored by the same gang of bits. In building these openings, in referring to Figs. 1 and 3, it will be noticed that the series of openings nearer approach one end than they do the other, the difference at the end having the widest margin being equal to about the diameter of an ordinary egg. Now, as the eggs are held in an upright position within the cup-shaped openings of the trays, it is absolutely necessary that the eggs of the several superposed trays do not touch. This is brought about by means of the trays B, which are made of a width less by approximately half the thickness of an egg than the case proper, as will be noticed in referring to Fig. 3, the end strips $a$, as stated, however, being made the full width of the casing.

In making the trays of a width less than the casing A and terminating the egg-seatings nearer one end of the tray than the other, I accomplish two things; First, there is permitted a free ventilation within the casing, as the ventilating spaces come upon alternate sides, insuring the air passing from side to side in circulating, as will be understood in referring to Figs. 2 and 3. Secondly, the egg-seatings of the several trays are staggered out of line with each other.

Now in filling an egg-crate constructed according to my invention the first tray is put into the bottom of the case in any convenient way. The eggs are then placed within the openings, when the second tray is ready to be placed within the casing. The position of the second tray, however, is determined by the position of the first tray, as it is necessary that the projecting ends of the strips $a$ of the upper tray come opposite to those of the lower, as will be noticed in referring to Fig. 3. This reversal in a horizontal plane brings the narrowest end of the upper tray above the end having the widest margin of the tray below it, so that the series of egg-openings of the upper tray fall squarely between the series of egg-openings in the lower tray. The third tray would be placed in a position corresponding to that of the first tray, the fourth tray being in a position corresponding to that of the second, and so on. In arranging these trays in a reversed position I further provide an opening between the tray and the egg-casing upon opposite sides, which offer a ready means of ventilation within the casing, as will be understood in referring to Fig. 2. By this means the eggs are given full protection, they cannot work out their seatings, and so are given the best possible protection.

The case as well as the trays being made of wood permits them being readily cleaned, and there is further a free circulation of air between the trays, thus tending to keep the eggs fresh.

The device is noticeable because of its extreme simplicity.

Now, having thus described my said invention, what I claim as new, and desire to secure by United States Letters Patent, is—

In an egg carrier the casing and a horizontally grooved end piece placed in each end of the casing, combined with a series of duplicate trays of a width less than the casing and provided with egg-shaped seatings, and which have their ends snugly secured to said end pieces said trays being reversed in the casing so that there is a ventilating space left between the edges of the trays and the side of the casing on each alternate side so as to cause a constant circulation of air, and to cause said egg-shaped seatings within said trays each to be out of line or staggered with respect to the other, all substantially as and for the purpose set forth.

In testimony whereof I affix my signature in presence of two witnesses.

THOMAS SCHOALES FERGUSON.

Witnesses:
ELMER G. STARR,
G. W. SUES.